T. P. MOHR.
POULTRY COOP.
APPLICATION FILED APR. 24, 1911.
1,084,221.
Patented Jan. 13, 1914.
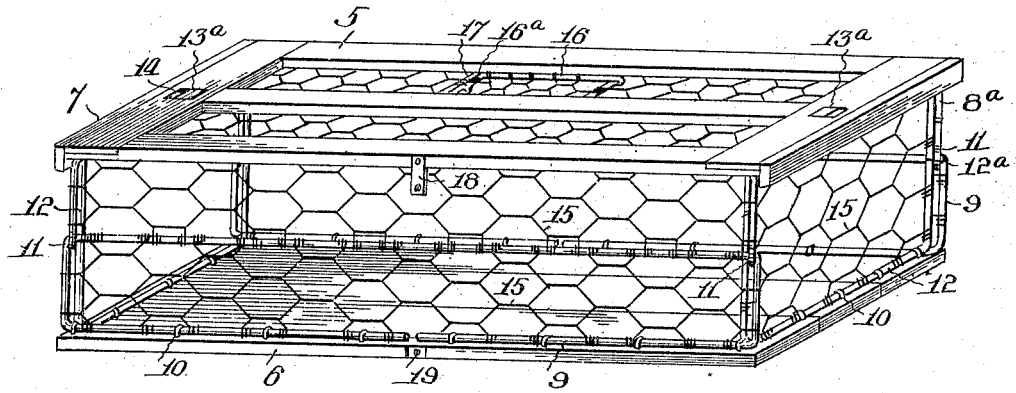
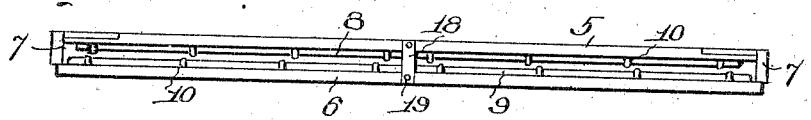
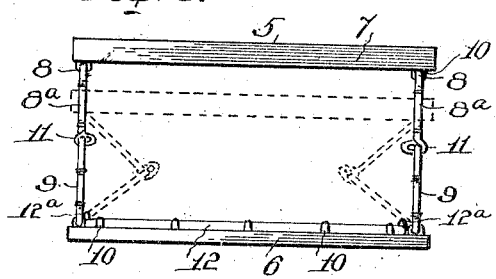
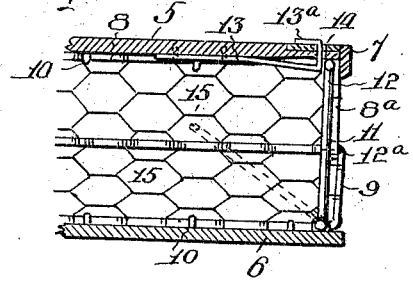
Witnesses:
R. J. Beall
D. R. Hershey
Inventor:
Theodore P. Mohr,
By John B. Thomas & Co.
Attorneys

UNITED STATES PATENT OFFICE.

THEODORE P. MOHR, OF NEW ORLEANS, LOUISIANA.

POULTRY-COOP.

1,084,221.  Specification of Letters Patent.  Patented Jan. 13, 1914.

Application filed April 24, 1911. Serial No. 623,084.

*To all whom it may concern:*

Be it known that I, THEODORE P. MOHR, a citizen of the United States, residing at New Orleans, in the parish of Orleans and State of Louisiana, have invented a Poultry-Coop, of which the following is a full and complete specification.

My invention is an improvement in poultry-coops, and relates more especially to that class in which the coop is adapted to be knocked down or folded so as to occupy but comparatively little space in transportation, being an improvement on the coop shown and described in my prior Patent No. 670,325, dated March 19, 1901.

The primary object of my present invention is to provide a folding poultry coop of light construction which can be readily and conveniently folded into compact form to occupy a minimum amount of space, and when extended or opened for use will provide a light coop in which the foldable parts are securely locked together and thoroughly braced to produce a durable structure.

Other objects and advantages of my present invention will hereinafter appear, and what I claim as new and desire to secure by Letters-Patent is more specifically set forth in the appended claims.

In the accompanying drawings, which form a part of this specification: Figure 1 is a perspective view of a folding poultry-coop, constructed in accordance with my invention, showing the parts extended or arranged for use. Fig. 2 is a side elevation, showing the parts of the coop folded for transportation. Fig. 3 is an end view of the coop, with the ends folded down upon the bottom, the dotted lines showing the top lowered and the sides partly folded. Fig. 4 is a longitudinal sectional view through one end of the coop, showing the manner of locking the parts in extended position.

Like numerals of reference indicate like parts in all the figures of the drawings.

In carrying out my present invention the top 5 and bottom 6 are preferably made up of wood, the bottom consisting of several boards suitably connected together, and the top comprising longitudinal strips and connecting end pieces, to form an open frame of light construction, the open spaces of said top being covered by wire-netting, as shown in Fig. 1 of the drawings. At the outer edges of the end pieces of the top are attached battens 7, which project below the top, for the purpose hereinafter explained. The sides and ends of the coop are formed in the present instance of wire frames covered by wire-netting, said frames being constructed in a particular manner so that they may be folded inward and the top lowered upon the same close to the bottom, thereby forming a compact device for convenience in transportation.

Each side of the coop consists of two wire frames or sections 8 and 9, hinged together and to the top and bottom of the coop, respectively. The wire-frame constituting the section 9 of the side of the coop is rectangular in shape and is connected at one of its longitudinal sides to the bottom 6 by means of staples 10, permitting said section to swing down upon the bottom of the coop. The other frame or section 8 of the side of the coop consists of a length of wire attached to the underside of the top 5 by staples 10, and having downwardly bent end members $8^a$ terminating in eyes 11, receiving the outer portion of the wire-frame 9 for hingedly connecting said frames together, and so that they may fold one upon the other between the top and bottom of the coop, as indicated in Fig. 3.

The ends of the coop are each formed of a single rectangular wire-frame 12, of such size as to fit between the top, sides and bottom of the coop, said frames 12 being hingedly connected at their lower end to the bottom of the coop by staples 10, whereby said end frames may be swung down to rest flat upon the bottom of the coop, as indicated in Figs. 3 and 4.

All the frames, constituting the sides and ends of the coop are covered by poultry-wire-netting 15, attached by bending the wire of the netting around the wire of the frames as shown in the drawings.

When the ends 12 of the coop are in upright position between the hinged sides they are prevented from swinging outward by means of the depending battens 7, and for the purpose of securely locking said end frames in this position each end of the top 5 of the coop is provided on its underside with a spring catch 13, the hook-end of which passes upward through an opening 14 in the top so that the tail-end $13^a$ of said catch may rest on the top and thereby limit the downward movement of the engaging portion of the catch, as well as provide means for releasing said catch from the top of the coop. In this instance, as will be noted, the upper or free end of each wire frame 12 is confined between the catch and batten and thereby firmly held.

In order to connect the folding side frames of the coop to the end frames, and thereby increase the stability of the coop or structure when extended for use as shown in Fig. 1, the eyes 11, which connect the sections of the side frames are elongated, and the side wires of the frames 12 provided with studs, 12ª, which may take into the eyes, whereby at each corner of the coop the adjoining wires of the sections 8, 9 and 12 are connected together so as to reinforce each other in supporting the top.

Access to the inner side of the coop is provided for by means of an opening in the top 5 between two of the longitudinal strips, said opening being covered by a hinged door 16, constructed of wire, the outer or free end of the door being bent downward, as at 16ª, to frictionally engage the rod or crossbar 17 at one side of the opening.

When the coop is arranged for use in holding poultry the sectional sides and the end frames are disposed vertically between the top and bottom and are securely held in this position by the locking means hereinbefore described. In this condition the device presents a very light and convenient coop, possessing the required strength, and may be handled in the same manner as an ordinary box-coop for shipping poultry from one place to another. When it is desired to return the coop empty the same may be folded to occupy comparatively little space for economy in transportation, permitting quite a number of the folded coops to be stacked one upon another. In folding the coop it is only necessary to release the end frames 12 and fold them down upon the bottom 6, and then fold the sectional side frames inward, (see Fig. 3), which permits the top to be lowered upon the bottom so as to inclose the wire frames between them, the battens 7 of the top resting against the ends of the bottom, as shown in Fig. 2. When folded in this manner the parts are secured together by means of plates 18 attached to the side edges of the top engaging pins 19 projecting from the side edges of the bottom.

Having described my invention, I claim:—

1. In a folding coop, the combination with a top and a bottom, of sides each consisting of two frames hingedly connected to each other and to the top and bottom, respectively, to fold inwardly one upon the other, elongated eyes forming a part of the hinge connection between the aforesaid frames and projecting inwardly when the frames are disposed vertically on a line with each other, and end frames each comprising a rectangular wire frame hingedly connected to the bottom and having inwardly-projecting studs formed integrally with the side members thereof to engage in the elongated eyes on the foldable sides and brace the latter; together with means carried by the top for engaging and holding the ends of the coop in upright position, substantially as shown and described.

2. In a folding coop, the combination with a top and a bottom, of sides each consisting of two frames hingedly connected to each other and to the top and bottom, respectively, to fold inwardly one upon the other, elongated eyes forming a part of the hinge connection between the aforesaid frames and projecting inwardly when the frames are disposed vertically on a line with each other, and end frames each comprising a rectangular wire frame hingedly connected to the bottom and having inwardly-projecting studs formed integrally with the side members thereof to engage in the elongated eyes on the foldable sides and brace the latter; together with battens attached to the ends of the top to depend below the same and form stops for the swinging end frames, and means for holding the end frames against the battens.

3. In a folding coop, the combination with a top and a bottom, of sides each consisting of two frames hingedly connected to each other and to the top and bottom, respectively, to fold inwardly one upon the other, elongated eyes forming a part of the hinge connection between the aforesaid frames and projecting inwardly when the frames are disposed vertically on a line with each other, and end frames each comprising a rectangular wire frame hingedly connected to the bottom and having inwardly-projecting studs formed integrally with the side members thereof to engage in the elongated eyes on the foldable sides and brace the latter; together with battens secured to the ends of the top to depend below the same and form stops for the end frames when raised, and flat springs let into the top and having depending bent ends engaging the end frames of the coop to hold them against the battens and in locked engagement with the sides, substantially as shown and for the purpose set forth.

In testimony whereof I have signed my name to this specification in the presence of two subscribing witnesses.

THEODORE P. MOHR.

Witnesses:
J. H. VAN HORSSEN,
W. W. FISK.